United States Patent [19]
Chu et al.

[11] Patent Number: 5,858,901
[45] Date of Patent: Jan. 12, 1999

[54] TEMPERATURE STABLE DIELECTRIC

[75] Inventors: Mike Ssu Hai Chu, Lewiston; John Bultitude, Youngstown, both of N.Y.; Christopher Hood, Reading, United Kingdom; Kay Louise Nimmo; Michael Rand, both of Oxon, United Kingdom

[73] Assignee: Cookson Group plc, London, United Kingdom

[21] Appl. No.: 604,587

[22] Filed: Feb. 21, 1996

[30] Foreign Application Priority Data

Mar. 6, 1995 [GB] United Kingdom ............... 9504443

[51] Int. Cl.$^6$ ................ C04B 35/46; H01G 4/12
[52] U.S. Cl. ............ 501/138; 501/139; 361/321.4
[58] Field of Search .............. 501/138, 139, 501/321.2; 361/321.4, 311, 313

[56] References Cited

U.S. PATENT DOCUMENTS

| | | | |
|---|---|---|---|
| H987 | 11/1991 | Buchanan et al. | 501/137 |
| 4,309,295 | 1/1982 | McSweeney | 501/136 |
| 4,870,539 | 9/1989 | Chance et al. | 361/321 |

FOREIGN PATENT DOCUMENTS 1542105  9/1968  France .

OTHER PUBLICATIONS

Y. Sakabe, "Dielectric Materials for Base–Metal Multilayer Ceramic Capacitors" in Am. Ceram. Bull., 66, No. 9, 1338–1341 (1987).

H. Saito et al., "X7R Multilayer Ceramic Capacitors with Nickel Electrodes" in Jap. J. Appl. Phys., 30, No. 9B, 2307–2310 (1991).

Y. Sakabe et al., "New Barium Titanate Based Material..." in Ferroelectrics, vol. 133, 133–138 (1992).

Translation of JP 5–21267 (1993).

Database WPI, Section Ch., week 7537, Derwent Pub., class L03, AN 75–61033W, XP002005335, of JP–A–50 001 400 of Jan. 8, 1975.

*Primary Examiner*—Deborah Jones
*Attorney, Agent, or Firm*—Watson Cole Stevens Davis, P.L.L.C.

[57] ABSTRACT

Barium titanate temperature stable dielectric compositions are disclosed containing magnesium oxide, silicon dioxide, germanium oxide and optionally an oxide or carbonate of barium, calcium or strontium which can be used to produce multilayer ceramic capacitors with nickel or nickel alloy electrode that have a variation of capacitance with temperature of less than ±10% over the range −55° C. to +125° C. compared with the value of the capacitance at 25° C., or to produce multilayer ceramic capacitors with noble metal inner electrodes that have a variation of capacitance with temperature of less than ±15% over the range 55° to +125° C. compared with the value at 25° C., and which does not contain any second phases after sintering.

9 Claims, 1 Drawing Sheet

TEMPERATURE STABLE DIELECTRIC

BACKGROUND OF THE INVENTION

The present invention relates to a temperature stable dielectric and, in particular to a barium titanate dielectric composition which can be used to produce multilayer ceramic capacitors with base metals, such as nickel, as internal conductive electrodes. The multilayer capacitors thus produced have their variation of capacitance with temperature of less than ±10% over the range −55° C. to 125° C. as compared to the value at 25° C. The ceramic microstructures of the above capacitors do not contain second phases.

The present invention also relates to a temperature stable dielectric and, in particular, to a barium titanate dielectric composition which can be used to produce multilayer ceramic capacitors with noble metals, such as palladium or palladium/silver alloy, as internal conductive electrodes. The multilayer ceramic capacitors thus produced have their variation of capacitance with temperature of less than ±15% over the range −55° C. to 125° C. The ceramic microstructures of the above capacitors do not contain second phases.

PRIOR ART

Multilayer ceramic capacitors are well known in the art and have been manufactured for many years by a variety of processes, all of which result in alternate layers of a ceramic dielectric composition and metal in the devices. The typical manufacturing processes require the co-sintering of the ceramic dielectric composition and the metal to consolidate these materials into working devices. The co-sintering process is generally carried out in an air atmosphere and thus the inner electrodes of the devices generally comprise a precious metal such as platinum, gold, palladium, or alloys thereof, to avoid oxidation during the sintering process.

However, the high price of inner electrodes comprising a precious metal has led to the development of ceramic dielectric materials which can be fabricated into multilayer capacitors with base metal electrodes (Y. Sakabe, Am. Ceram. Bull 66, 1338–341) with the sintering of the structure being carried out in an inert or reducing atmosphere. However, the ceramic dielectric materials developed were not very stable with respect to the temperature variation of capacitance ΔC. In particular, components with Z5U characteristics ΔC=+22% to −56% with respect to capacitance values at 25° C. over the temperature range +10° to +85° C., or Y5V characteristics ΔC=+22% to −82% over the range −30° to +85° C. have been produced commercially with electrodes of nickel or one of its alloys.

Recently, various routes for improving the temperature stability of ceramic dielectric materials for multilayer capacitors with nickel inner electrodes have been tried, as follows:

The Japanese Journal of Applied Physics, 30, 2307–2310 (1991) reported the properties of X7R Multilayer Ceramic Capacitors with Nickel Electrodes. The X7R designation indicates a ΔC=±15% over the temperature range −55° C. to +125° C. so these components are far more temperature stable. The maximum variation of ΔC in this temperature range was −10% at −55° C. with a dielectric constant=3200 and a dissipation factor 1.7% at 25° C. Ferroelectrics 1992, Volume 133, p 133–138 reported a new material which in multilayer capacitors had a dielectric constant=3590 and dissipation factor=1.6% also with X7R characteristics, but with a maximum variation of AC of −12.5% at +125° C. Japanese Patent No. 5-21267 discloses further compositions which can fulfill the X7R characteristics.

All of the materials disclosed in the prior art use acceptor dopants and $SiO_2$-containing glasses to achieve the resistance to reduction necessary when co-firing with nickel and to achieve the X7R temperature characteristics. However, the continuing demands for electronic circuitry to remain stable over wide fluctuations in temperatures has led to a requirement for even more stable capacitance in this respect.

We have now developed a dielectric material which can be fabricated into multilayer capacitors with nickel inner electrodes which have a variation of capacitance with temperature within the limits of X7R characteristics of AC=2%10% over the temperature range of −55° to 125° C.

Multilayer capacitors with stable temperature characteristics are typically produced using dielectric powders that are formulated by adding a small amount of $Nb_2O_5$ together with other minor ingredients to a $BaTiO_3$ powder. It is well known among those who are familiar with the art that all the $Nb_2O_5$ containing compositions suffer from one deficiency that the ceramic microstructure contains a titania rich second phase after sintering. The presence of the second phase material is highly undesirable when multilayer capacitors are produced with thinner and thinner dielectric layer thickness. The present invention relates to temperature stable dielectric composition that do not contain $Nb_2O_5$ as an additive. The ceramic microstructure is therefore free of second phase after sintering.

SUMMARY OF THE INVENTION

Figure 1:
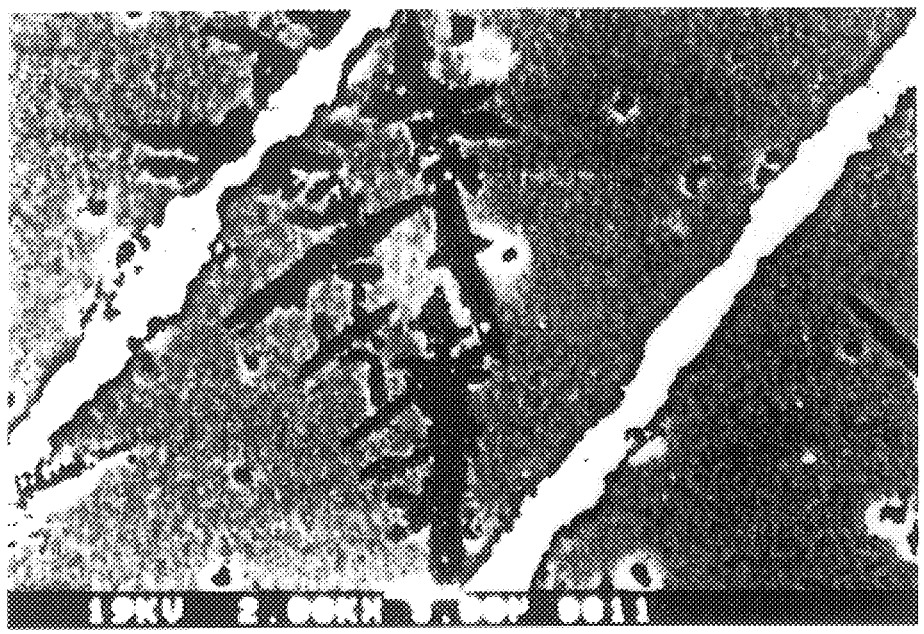
FIG. 1 is a ceramic micrograph of a $BaTiO_3$ composition containing $Nb_2O_5$ together with other additives which contains a titania rich second phase.

Accordingly, the present invention provides a dielectric ceramic powder composition comprising barium titanate, magnesium oxide, or a precursor therefor, silicon dioxide or a precursor therefor, germanium dioxide or a precursor therefor and optionally barium, calcium or strontium oxide or carbonate or a precursor therefor, which can be fabricated into multilayer ceramic capacitors with nickel or nickel alloy inner electrodes that have a variation of capacitance with temperature of less than ±10% over the range −55° C. to +125° C. compared with the value of the capacitance at 25° C., or which can be fabricated into multilayer ceramic capacitors with noble metal inner electrodes that have a variation of capacitance with temperature of less than ±15% over the range −55° C. to +125° C. compared with the value at 25° C., and which does not contain any second phase after sintering.

DETAILED DESCRIPTION OF THE INVENTION

The dielectric ceramic powder composition preferably comprises a dielectric ceramic powder composition which comprises from 0.01 to 2.00% by weight magnesium oxide or a precursor therefor, preferably 0.10 to 1.00% by weight magnesium oxide; from 1 to 6% by weight barium, calcium or strontium oxide or carbonate or a precursor therefor; and from 0.10 to 2.00% by weight silicon dioxide or a precursor therefor, preferably from 0.10 to 1.00% by weight silicon dioxide; and from 0.10 to 2.00% by weight germanium dioxide or a precursor therefor, preferably 0.50 to 1.50% by weight of germanium dioxide; all percentages being based on the weight of the barium titanate.

Suitable precursors of magnesium oxide include magnesium carbonate, magnesium hydroxide and magnesium acetate. Suitable precursors of germanium dioxide include germanium acetate, germanium oxalate or germanium acetylacetonate. When germanium dioxide is used it may be employed in the amorphous or crystalline form. Suitable precursors of silicon dioxide include silicon acetate and silicon alkoxides such as silicon tetraethoxide.

Generally barium as barium oxide or barium carbonate will be added to the barium titanate composition in order to ensure that the resistivity of the composition is within the desired limits. The resistivity depends upon the barium to titanium ratio in the composition which should preferably be greater than 1:1. Optional additives to the composition of the present invention are acceptor dopants such as manganese dioxide, cobalt oxide or zinc oxide and these may be included in an amount of up to 0.2% by weight. A part of the magnesium oxide may be substituted by nickel oxide or zinc oxide in an amount of up to 0.5% by weight. Furthermore, alumina or chromium dioxide may be included in the compositions in an amount of 0.01 to 0.1% by weight. Also, rare earth oxides such as dysprosium may be included in order to confer reduction resistance to the dielectric.

The dielectric ceramic powder composition used in the present invention preferably has an average particle size in the range of from 0.5 to 1.5 $\mu$m.

The present invention includes within its scope tapes which are cast according to conventional tape casting techniques from a slurry of the dielectric ceramic powder composition as above defined. Preferably these tapes will have a thickness of about 0.0040 cm before sintering.

The present invention furthermore includes within its scope a multilayer capacitor which is fabricated from a dielectric ceramic powder composition as described above, in particular from a plurality of tapes as defined above. These multilayer capacitors have internal electrodes which comprise either base metal electrodes, such as nickel or nickel alloy, or nobel metal electrodes, such as palladium or palladium silver alloy.

The present invention will be further described with reference to the following non-limiting Examples.

EXAMPLE 1

To 643.4 g of high purity barium titanate powder (MBB TAM Ceramics Inc.) was added 3.9 g magnesium oxide, 21.03 g barium carbonate, 6.4 g silicon dioxide and 6.63 g germanium dioxide. The mixture was ball milled for 1 hour with 5000 g of a yttria stabilised zirconia milling media with 800 cc of deionised water. The resulting slurry was dried and screened through a 40 mesh screen.

400 g of the resulting powder was charged into a ball mill with 109.9 g Binder No. 73210 and 96.0 g Binder No. 73211 (both supplied by MSI Ltd., USA), together with 1920 g of 0.5 in diameter yttria stabilised zirconia media and milled for about 16 hours to obtain a homogenously dispersed slurry.

The slurry had a viscosity in the range of from 1500 to 3000 centipoise. The slurry was filtered and cast in accordance with standard techniques, into a tape having a thickness of 0.0040 cm. The tape was then printed with a nickel ink, C40524R2, supplied by Gwent Electronic Materials, Gwent, UK and laminated to give 10 active dielectric layers by procedures well known in the art. Several of these capacitors were then co-sintered according to the conditions outlined in the following Examples.

EXAMPLE 2

Capacitors prepared as described in Example 1 were heated at 4° C./min from ambient to 450° C. for 1 hour in air to remove the organic binders. The temperature was then increased at 4° C./minute to 1360° C. in an atmosphere of nitrogen, hydrogen and water vapour so that the partial oxygen pressure at this temperature was $10^{-12}$ atmospheres. After 2 hours at this temperature the furnace was cooled at 4° C./minute to 250° C. before air was admitted and after further cooling the resulting multilayer capacitors were removed.

EXAMPLE 3

Capacitors prepared as described in Example 1 were heated, from ambient at 4° C./minute to 800° C. in a wet nitrogen atmosphere to remove the organic binders. The atmosphere was then changed to nitrogen, hydrogen and water vapour and heating continued to 1360° C. so that at this temperature the partial oxygen pressure was $10^{-12}$ atmospheres. After two hours at this temperature the furnace was cooled at 4° C./min to 250° C. before air was admitted and after further cooling the resulting multilayer capacitors were removed.

EXAMPLE 4

The organic binders were partially removed from the multilayer capacitors by heating at 260° C. for 48 hours in air before following the procedure as outlined in Example 2.

EXAMPLE 5

The organic binders were partially removed from the multilayer capacitors by heating at 260° C. for 48 hours in air before following the procedure as outlined in Example 3.

EXAMPLE 6

The organic binders were partially removed from the multilayer capacitors by heating at 260° for 48 hours in air. The capacitors were then heated at 4° C./min from ambient to 450° C. for 1 hour in air to remove the remaining binder residues. An atmosphere of carbon monoxide and carbon dioxide was introduced and the temperature increased at 4° C./min to 1360° C. such that the partial oxygen pressure at this temperature was $10^{-8}$ atmospheres. After 2 hours at this temperature the furnace was cooled at 4° C./min to 250° C. before air was admitted and the capacitors were removed after further cooling.

Termination electrodes of DuPont silver paint no. 4822, which is a mixture of silver and glass frit in a binder, were applied at opposite ends of the multilayer capacitor in order to connect alternate electrode layers. The units were then heated to about 810° C. in a reducing atmosphere in order to form the electrical contacts.

The capacitance (C), dissipation factor (DF) and capacitance change with temperature (TC) versus capacitance at 25° C. were then measured with a Model HP4274A capacitance bridge at a frequency of 1 kHz, over the temperature range from −55° C. to +125° C. The dielectric constant (K) was calculated using the fundamental relationship:

| where |
|---|
| c = $(KK_oAn)$ − t |
| $K_o$ = permittivity of free space |
| A = area of electrode overlap |
| n = number of active dielectric layers |
| t = dielectric thickness |

The properties of the multilayer capacitors are summarised in Table 1.

TABLE 1

| | Example 2 | Example 3 | Example 4 | Example 5 | Example 6 |
|---|---|---|---|---|---|
| C (nf) at 25° C. | 63.06 | 59.09 | 59.97 | 158.27 | 55.38 |
| DF (%) at 25° C. | 1.26 | 1.70 | 1.33 | 1.40 | 1.25 |
| K at 25° C. | 2782 | 2607 | 2646 | 2571 | 2443 |
| TC (%) at Temp | | | | | |
| −55 | −5.5 | −6.6 | −6.3 | −7.1 | −3.1 |
| −35 | −4.0 | −4.7 | −3.3 | −5.3 | −1.6 |
| −15 | −1.2 | −2.6 | −1.6 | −2.9 | 0.6 |
| 5 | 1.0 | 0.3 | 0.7 | −0.4 | 1.4 |
| 25 | 0.0 | 0.0 | 0.0 | 0.0 | 0.0 |
| 45 | −1.6 | −1.6 | −1.3 | −1.5 | 1.0 |
| 65 | −2.5 | −2.5 | −2.2 | −2.4 | 0.0 |
| 85 | −3.5 | −2.9 | −3.1 | −2.8 | −2.3 |
| 105 | −3.1 | −1.9 | −2.6 | −1.8 | −2.4 |
| 125 | 5.5 | 7.9 | 5.9 | 7.8 | 5.7 |

The microstructure was examined with a scanning electron microscope and there was no second phase.

EXAMPLE 7

Multilayer ceramic capacitors were prepared in the same manner as described in Example 1 except that a 70 weight percent palladium, 30 weight percent silver alloy was used as internal electrodes. The multilayer capacitors were then sintered in air at 1320° C. for 2 hours, after their binders were removed by heating at 260° C. for 48 hours.

The capacitance (C), dissipation factor (DF) and capacitance change with temperature (TC) versus capacitance at 25° C. were then measured with a Model HP4274A capacitance bridge at a frequency of 1 kHz, over the temperature range from −55° C. to +125° C. The dielectric constant (K) was calculated using the equation detailed above.

The results were given in Table 2 below:

TABLE 2

| C (nF) at 25° C. | 60.65 |
|---|---|
| DF (%) at 25° C. | 1.23 |
| K at 25° C. | 2306 |
| T1 % at Temp | |
| −55 | −8.3 |
| −35 | −5.7 |
| −15 | −3.1 |
| 5 | −0.4 |
| 25 | 0.0 |
| 45 | −1.7 |
| 65 | −4.6 |
| 85 | −5.6 |
| 105 | −4.8 |
| 125 | 2.4 |

Figure 2:
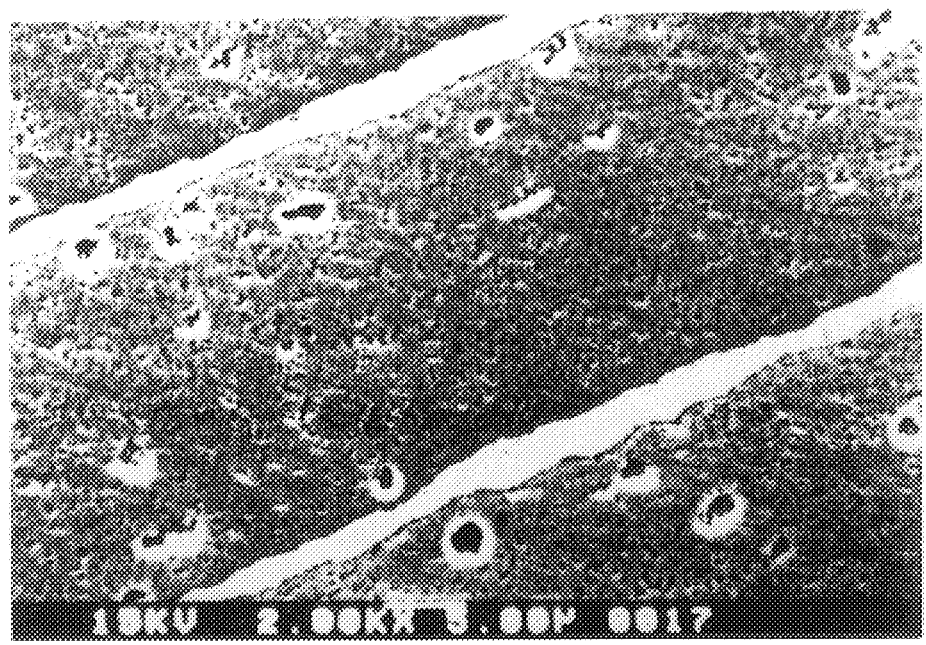
FIG. 2 is a ceramic micrograph of the composition of Example 7 showing the absence of the second phase in the compositions of the invention.

The microstructure was examined with a scanning electron microscope and there was no second phase. A micrograph of this structure is given in FIG. 2.

We claim:

1. A dielectric ceramic powder composition comprising:
   a) barium titanate;
   b) 0.01 to 2.0 wt %, based on the weight of barium titanate, of a component selected from the group consisting of magnesium oxide and a precursor therefor;
   c) 0.01 to 2.0 wt %, based on the weight of barium titanate, of a component selected from the group consisting of silicon dioxide and a precursor therefor;
   d) 0.01 to 2.0 wt %, based on the weight of barium titanate, of a component selected from the group consisting of germanium dioxide and a precursor therefor; and
   e) 1 to 6 wt %, based on the weight of barium titanate, of a component selected from the group consisting of barium oxide, calcium oxide, strontium oxide, barium carbonate, calcium carbonate, strontium carbonate and precursors therefor;
   said composition being capable of fabrication into multilayer ceramic capacitors with nickel or nickel alloy inner electrodes that have a variation of capacitance with temperature of less than ±10% over the range −55° C. to +125° C. compared with the value of the capacitance at 25° C., and which does not contain any second phase after sintering, or into multilayer ceramic capacitors with noble metal inner electrodes that have a variation of capacitance with temperature of less then ±15% over the range −55° C. to +125° C. compared with the value of the capacitance at 25° C., and which does not contain any second phase after sintering.

2. A dielectric ceramic powder composition according to claim 1 which comprises from 0.01 to 2.00% by weight magnesium oxide, from 1 to 6% by weight barium carbonate, from 0.01 to 5.00% by weight silicon dioxide and from 0.01 to 2.00% by weight germanium dioxide, based on the weight of the barium titanate.

3. A dielectric ceramic powder according to claim 1 which has an average particle size in the range of from 0.5 to 1.5 μm.

4. A tape which is cast from a slurry of a dielectric ceramic powder composition as defined in claim 1.

5. A tape according to claim 4 which has a thickness of about 0.0040 cm before sintering.

6. A multilayer capacitor which is fabricated from a dielectric ceramic powder composition as defined in claim 1.

7. A multilayer capacitor which is formed from a plurality of tapes which are cast from a slurry of a dielectric ceramic powder composition as defined in claim 1.

8. A multilayer capacitor according to claim 6 wherein the inner electrodes are nickel or nickel alloy electrodes.

9. A multilayer capacitor according to 6 wherein the inner electrodes are palladium or palladium-silver alloy electrodes.

* * * * *